US012772212B2

(12) United States Patent
Mathur et al.

(10) Patent No.: US 12,772,212 B2
(45) Date of Patent: Oct. 20, 2026

(54) DEVICE AND METHODS FOR MANAGING CHANNEL ALLOCATION IN CBRS

(71) Applicant: SAMSUNG ELECTRONICS CO., LTD., Suwon-si (KR)

(72) Inventors: Ritik Prasad Mathur, Bangalore (IN); Mohit Agarwal, Bangalore (IN); Satya Kumar Vankayala, Bangalore (IN); Akhil Polamarasetty, Bangalore (IN); Jayasuryan Venkita Subramanyam Iyer, Bangalore (IN); Seungil Yoon, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 102 days.

(21) Appl. No.: 18/238,198

(22) Filed: Aug. 25, 2023

(65) Prior Publication Data

US 2023/0422219 A1 Dec. 28, 2023

Related U.S. Application Data

(63) Continuation of application No. PCT/KR2023/006866, filed on May 19, 2023.

(30) Foreign Application Priority Data

Jun. 24, 2022 (IN) ............................ 202241036498
Apr. 18, 2023 (IN) ............................ 2022 41036498

(51) Int. Cl.
*H04W 72/30* (2023.01)
*H04W 16/14* (2009.01)
(Continued)

(52) U.S. Cl.
CPC .......... *H04W 72/04* (2013.01); *H04W 16/14* (2013.01); *H04W 72/563* (2023.01)

(58) Field of Classification Search
CPC ... H04W 72/04; H04W 16/14; H04W 72/563; H04W 72/30; H04W 72/21
See application file for complete search history.

(56) References Cited

U.S. PATENT DOCUMENTS 10,999,844 B2 5/2021 Sevindik et al.
11,089,602 B2 8/2021 Sheriff et al.
(Continued)

FOREIGN PATENT DOCUMENTS

KR 10-2009-0096152 A 9/2009
KR 10-2022-0009217 A 1/2022
WO 2021/178836 A1 9/2021

OTHER PUBLICATIONS

International Search Report (PCT/ISA/210) issued Sep. 6, 2023 by the International Searching Authority in International Patent Application No. PCT/KR2023/006866.
(Continued)

*Primary Examiner* — Nicholas A Jensen
*Assistant Examiner* — Yonghong Zhao
(74) *Attorney, Agent, or Firm* — Sughrue Mion, PLLC

(57) ABSTRACT

A method performed by a Citizens Broadband Radio Service (CBRS) device (CBSD), may comprise, generating a grant request message comprising information on a number of grants and information on operation parameters. Each of the operation parameters is associated with a desired channel identified based on a list of desired channels. The method may comprise sending the grant request message to a Spectrum Access System (SAS).

16 Claims, 7 Drawing Sheets

(51) Int. Cl.

| | |
|---|---|
| ***H04W 72/04*** | (2023.01) |
| ***H04W 72/0453*** | (2023.01) |
| ***H04W 72/21*** | (2023.01) |
| ***H04W 72/56*** | (2023.01) |
| ***H04W 72/563*** | (2023.01) |

(56) References Cited

U.S. PATENT DOCUMENTS

| | | | | |
|---|---|---|---|---|
| 11,330,591 | B2 | 5/2022 | Raghothaman et al. | |
| 11,683,724 | B2 * | 6/2023 | Mueller ............ | H04W 28/0942 370/329 |
| 2020/0092731 | A1 * | 3/2020 | Beck ...................... | H04W 48/16 |
| 2020/0305159 | A1 | 9/2020 | Raghothaman et al. | |
| 2020/0396624 | A1 | 12/2020 | Sevindik et al. | |
| 2021/0029549 | A1 * | 1/2021 | Notargiacomo ...... | H04W 16/14 |
| 2021/0084658 | A1 * | 3/2021 | Sheriff .................. | H04W 16/18 |
| 2021/0127346 | A1 * | 4/2021 | Hmimy ................. | H04W 12/06 |
| 2021/0266949 | A1 | 8/2021 | Sharma et al. | |
| 2021/0352505 | A1 | 11/2021 | Sevindik et al. | |
| 2021/0368349 | A1 * | 11/2021 | Bandyopadhyay ... | H04W 16/16 |
| 2022/0022049 | A1 | 1/2022 | Park et al. | |
| 2022/0053336 | A1 * | 2/2022 | Taneja .................... | H04L 5/001 |
| 2022/0159563 | A1 | 5/2022 | Sasindran et al. | |
| 2022/0182987 | A1 | 6/2022 | Bennett | |
| 2023/0007668 | A1 * | 1/2023 | Al-Mufti ............. | H04W 72/121 |

OTHER PUBLICATIONS

Written Opinion (PCT/ISA/237) issued Sep. 6, 2023 by the International Searching Authority in International Patent Application No. PCT/KR2023/006866.

Wireless Innovation Forum, Signaling Protocols and Procedures for Citizens Broadband Radio Service (CBRS): Spectrum Access System (SAS)—Citizens Broadband Radio Service Device (CBSD), Interface Technical Specification, Document WINNF-TS-0016, Version V1.2.4, Jun. 26, 2019, 60 pages.

Extended European Search Report dated May 26, 2025, issued by the European Patent Office in European Application No. 23827383.3.

"Signaling Protocols and Procedures for Citizens Broadband Radio Services (CBRS): Spectrum Access System (SAS)—Citizens Broadband Radio Service Device (CBSD) Interface Technical Specification", Wireless Innovation Forum, 2020, WINNF-TS-0016, pp. 1-52 (60 pages total).

Office Action dated Dec. 18, 2025, issued by Indian Patent Office in Indian Patent Application No. 202241036498.

* cited by examiner

DEVICE AND METHODS FOR MANAGING CHANNEL ALLOCATION IN CBRS

CROSS REFERENCE TO RELATED APPLICATION

This application is a by-pass continuation application of International Application No. PCT/KR2023/006866, filed on May 19, 2023, which is based on and claims priority to Indian Provisional patent application number 202241036498, filed on Jun. 24, 2022, and Indian Complete patent application number 202241036498, filed on Apr. 18, 2023, the disclosures of which are incorporated by reference herein their entireties.

BACKGROUND

1. Field

Provided are Citizen Broadband Radio Service (CBRS) and a multi-grant procedure for managing channel allocation in CBRS.

2. Description of Related Art

Citizen Broadband Radio Service (CBRS) is a multi-tiered shared spectrum access technology which is aimed at enabling quicker and efficient deployment of services in 3.55 GHz to 3.70 GHz (150 MHz-wide) band. The CBRS may help in fields like industrial IOT, by reducing the cost of ownership and providing a private and reliable network.

The Citizens Broadband Radio Service Device (CBSD)-Spectrum Access System (SAS) interface specification provides a grant procedure to let a registered CBSD request access to spectrum from SAS. According to the current protocol definition, the CBSD may request access to only one contiguous channel in one grant request object.

A grant request may be denied in cases, such as, requested operating parameters (For example, maximum Equivalent Isotropic Radiated Power (maxEIRP)) which may cause high interference, requested spectrum is already being held by the CBSD indicating that the spectrum are out of sync, and so on. If the request is denied by the SAS, the CBSD may send a grant request again with other channel information in which the CBSD is interested. This process is repeated until a successful request, which could result in unwanted traffic to both the CBSD and SAS.

SUMMARY

An aspect of the disclosure is to disclose a device and method for providing a multi-grant procedure for Citizen Broadband Radio Service (CBRS).

Another aspect of the disclosure is to disclose a device and method for requesting multiple non-contiguous channels from a Spectrum Access System (SAS) in a single request to enable quick setup for transmission and lesser power consumption for interfacing.

Another aspect of the disclosure is to disclose a device and method for indicating to the SAS that the device is interested in any of the shared channels.

Another aspect of the disclosure is to disclose a device and method for filling the list of desired channels in an order of preference.

Another aspect of the disclosure is to disclose a device and method for allowing the SAS to grant access to as many available desired channels at that instant based on order of preference.

Provided is a multi-grant procedure for Citizen Broadband Radio Service (CBRS). According to an aspect of the disclosure, a method for managing a channel allocation in a CBRS system, includes: generating, by a Citizens Broadband Radio Service Device (CBSD), at least one channel allocation request comprising a plurality of channel grants and at least one operation parameter for each desired channel from a list of desired plurality of channels; and sending, by the CBSD, the at least one channel allocation request to a Spectrum Access System (SAS).

Accordingly to another aspect of the disclosure, a CBSD includes: a memory; a processor operatively connected with the memory, the processor configured to: generate at least one channel allocation request comprising a plurality of channel grants and at least one operation parameter for each desired channel from a list of desired plurality of channels; and send the at least one channel allocation request to a SAS.

Accordingly to another aspect of the disclosure, a method performed by a communication system comprising a transmitting device and a receiving device, includes: generating, by the transmitting device, at least one channel allocation request comprising a plurality of channel grants and at least one operation parameter for each desired channel from a list of desired plurality of channels; sending, by the transmitting device, the at least one channel allocation request to a receiving device; granting, by the receiving device, the at least one channel allocation request, and allocating, by the transmitting device, at least one desired channel to each channel grant based on an availability and an order of a priority of the channels from the list of desired plurality of channels.

According to embodiments, a method performed by a Citizens Broadband Radio Service (CBRS) device (CBSD), may comprise, generating a grant request message comprising information on a number of grants and information on operation parameters. Each of the operation parameters is associated with a desired channel identified based on a list of desired channels. The method may comprise sending the grant request message to a Spectrum Access System (SAS).

According to embodiments, a Citizens Broadband Radio Service Device (CBSD) comprises a transceiver. The CBDS comprises a processor operatively connected with the transceiver. The processor is configured to generate a grant request message comprising information on a number of grants and information on operation parameters, wherein each of the operation parameters is associated with a desired channel identified based on a list of desired channels. The processor is configured to send the grant request message to a Spectrum Access System (SAS).

These and other aspects of the embodiments herein will be better appreciated and understood when considered in conjunction with the following description and the accompanying drawings. It should be understood, however, that the following descriptions, while indicating at least one embodiment and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

Embodiments herein are illustrated in the accompanying drawings, throughout which like reference letters indicate corresponding parts in the various figures. The embodiments herein will be better understood from the following description with reference to the drawings, in which.

DETAILED DESCRIPTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Figure 1:
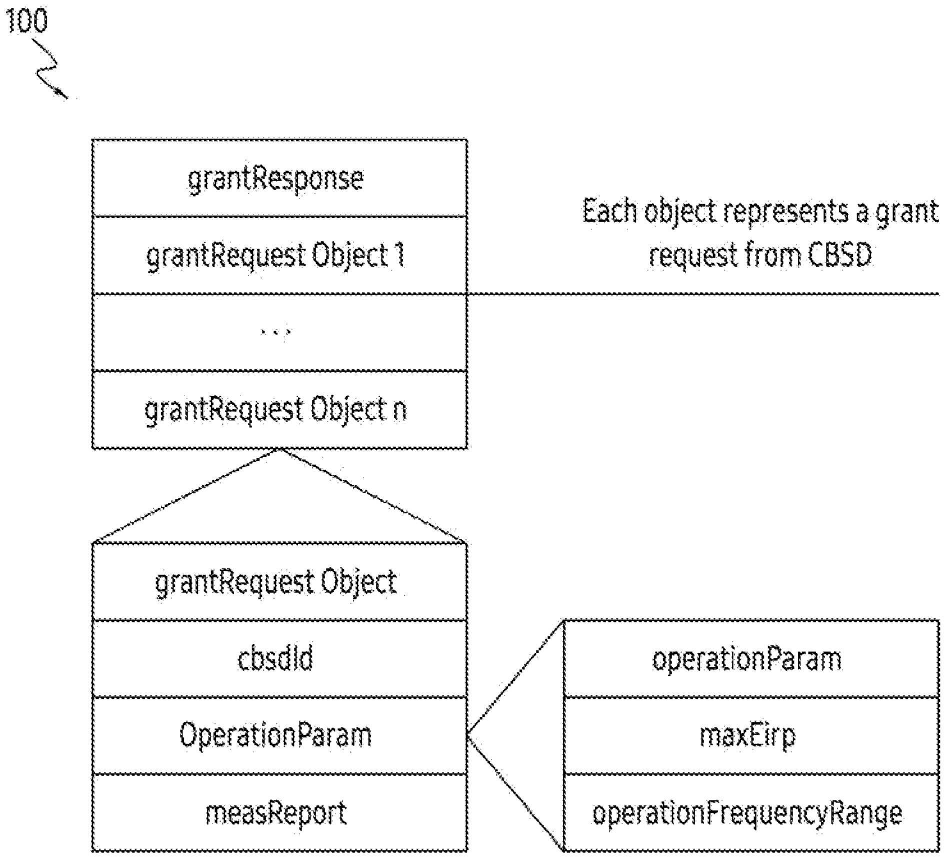
[RELATED ART] FIG. 1
FIG. 1 depicts an existing grant request message of the related art.

FIG. 1 depicts a grant request message 100. The grant request message includes an array of grant request objects, grantRequest object 1 to grantRequest object n. Each grant request object represents a request for grant from a Citizens Broadband Radio Service Device (CBSD) and each request object includes a cbsdId, an operationParam and a measReport (in some cases). The operation parameters may include max Equivalent Isotropic Radiated Power (maxEIRP) and an operation frequency range. A grant response message includes an array of grant response objects. Each grant response object represents a response to a grant request from a CBSD, each response object indicates result of the grant request by the CBSD, and each response object may include an operationParam and a suggestion by the SAS in case of failure. The SAS has to respond to each grant request, as the SAS currently considers each request separately.

Figure 2A:
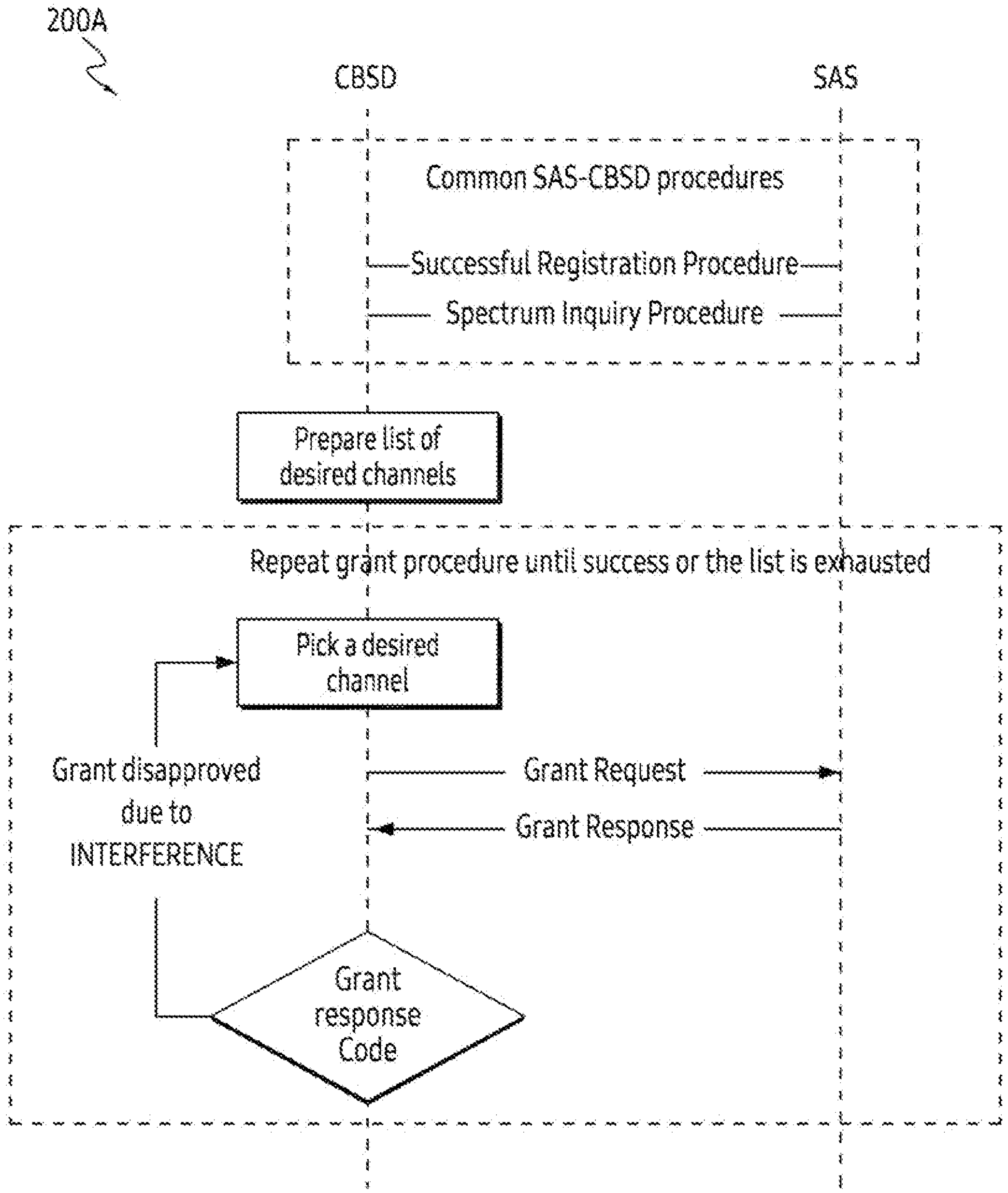
[RELATED ART] FIG. 2A
FIGS. 2A and 2B depict an existing protocol flow for the Grant procedure to let a registered Citizen Broadband Radio Service Devices (CBSD) request access to spectrum from SAS in the related art.
Figure 2B:
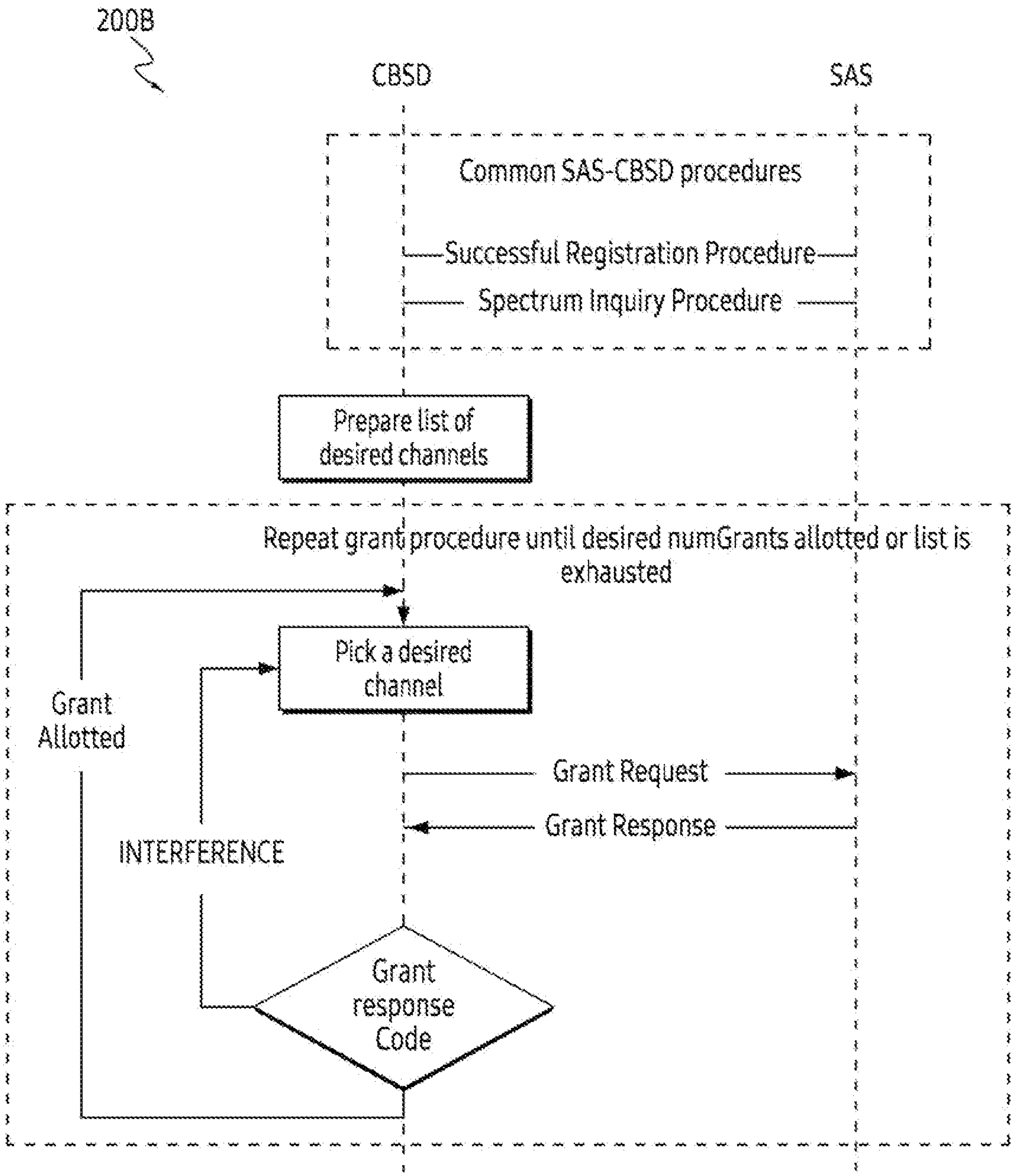
[RELATED ART] FIG. 2B

FIGS. 2A and 2B depict an existing protocol flow for the grant procedure to allow a registered CBSD request access to spectrum from the SAS. FIG. 2A depicts a scenario 200A, where the CBSD repeatedly sends grant requests until the request is successful. FIG. 2B depicts a scenario 200B, where the CBSD repeatedly sends grant requests until the request acquires desired number of grants.

Therefore, the existing procedures perform multiple request procedures with the SAS which may take longer to ensure usable spectrum for service and result in larger data packet delays.

The embodiments herein achieve a multi-grant procedure for Citizen Broadband Radio Service (CBRS). Access and operations to the CBRS spectrum are managed by a Spectrum Access System (SAS). Referring now to the drawings, and more particularly to FIGS. 3 through 6, where similar reference characters denote corresponding features consistently throughout the figures, there are shown embodiments.

Figure 3:
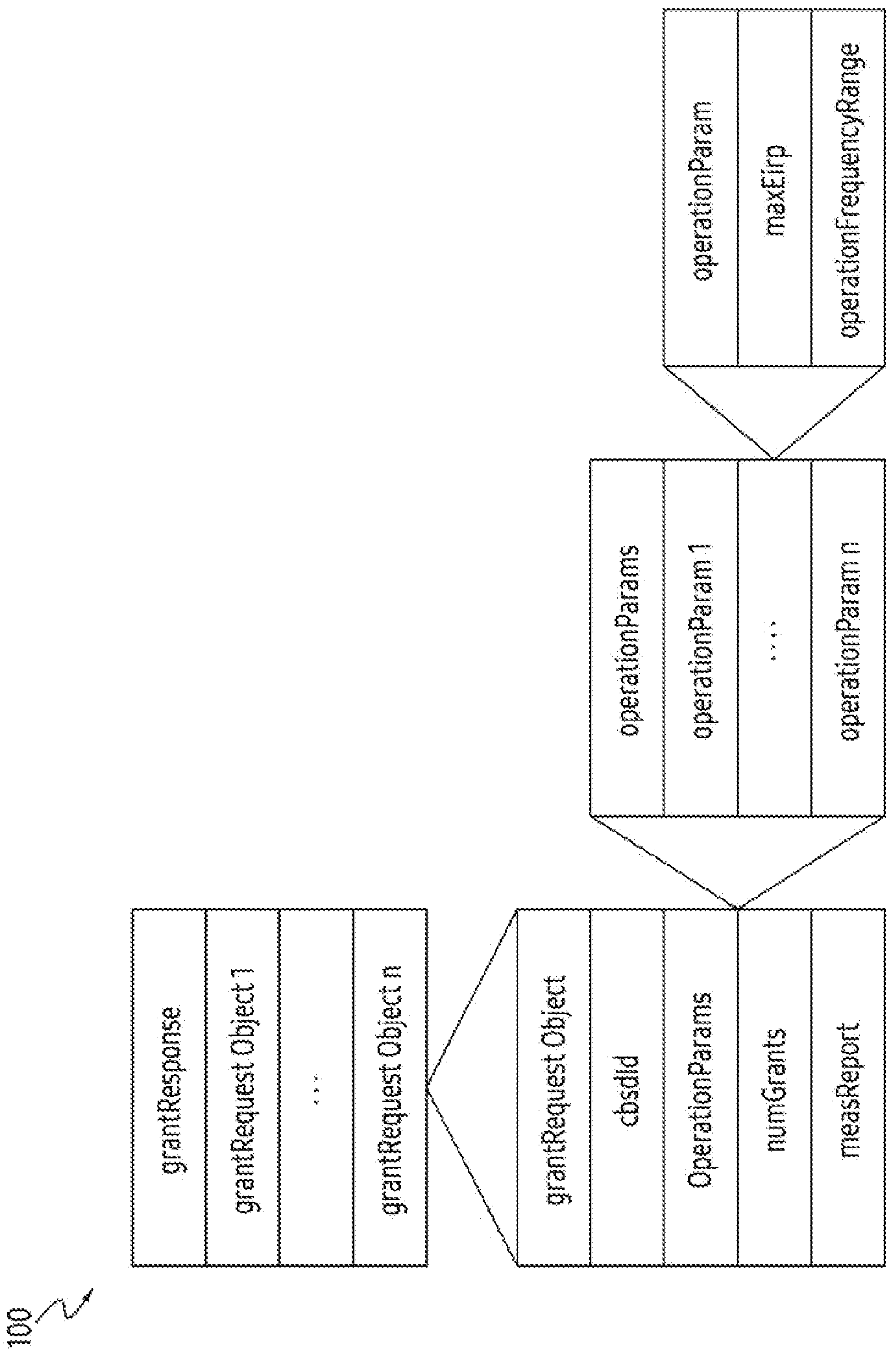
FIG. 3 depicts a proposed grantRequest message, according to embodiments as disclosed herein.

FIG. 3 depicts a proposed 'grantRequest' message 300. The following definitions may be based on a CBSD-SAS protocol and may be referred to herein:

'grantRequest' object: This object may be used by the CBSD to indicate its desired operation parameters and measurement report to the SAS.

'grantResponse' object: This object may be used by the SAS to approve or disapprove the grantRequest made by the CBSD.

'operationParam' object: The CBSD may use this object in the grantRequest to indicate its desired channel information and its desired Equivalent Isotropic Radiated Power (EIRP). If the grant request is disapproved, using this object, the SAS may choose to provide a new set of operation parameters to the CBSD for use in a new grantRequest.

The proposed grantRequest object may be modified to indicate interest in multiple grants and/or channels. The grantRequest message 300 includes an array of grantRequest objects; for example, grantRequest object 1, grantRequest object 2, grantRequest object 3, . . . , grantRequest object n. Each object may represent a request for grant.

In an embodiment herein, the grantRequest message 300 may be added with a 'numGrants' parameter in the grantRequest object. According to standard systems, an interface may add the parameters to the existing parameters in a message exchange mechanism. The CBSD may be configured to utilize the numGrants parameter to request for multiple grants using a single request. A request mechanism may aid for implementing the proposed multiple grant array request mechanism. The SAS may grant access to as many available desired channels at that instant (as depicted in FIG. 3), based on the number of grants mentioned or included in the grantRequest message 300.

In an embodiment herein, the grantRequest message 300 may be added with an operationParam array. The CBSD may be configured to indicate its interest in any of the shared channels to the SAS by filling the operationParam array with a list of desired channels. Based on the indicated interest, the SAS may grant access, if at least one of the desired channels is available at that instant. The operationParam array may be filled in the order of a priority by the CBSD. The operationParam array may include a plurality of operation parameters, such as operationParam 1, operationParam 2, operationParam 3, . . . , operationParam n. Each operationParam object may include a frequency range; i.e., an operation frequency range and a maximum equivalent isotropic radiated power (EIRP) required by the CBSD for an operation of the CBSD.

Further, the grantResponse message contains an array of grantResponse objects. Each grantResponse object represents a response to a grant request. In one embodiment, the grantResponse object may not be modified. In another embodiment, the grantResponse object may be modified. The SAS may respond with a rejection of the request or a successful request. If numGrants is met, the SAS may skip processing other grantRequest objects shared by the CBSD.

Figure 4:
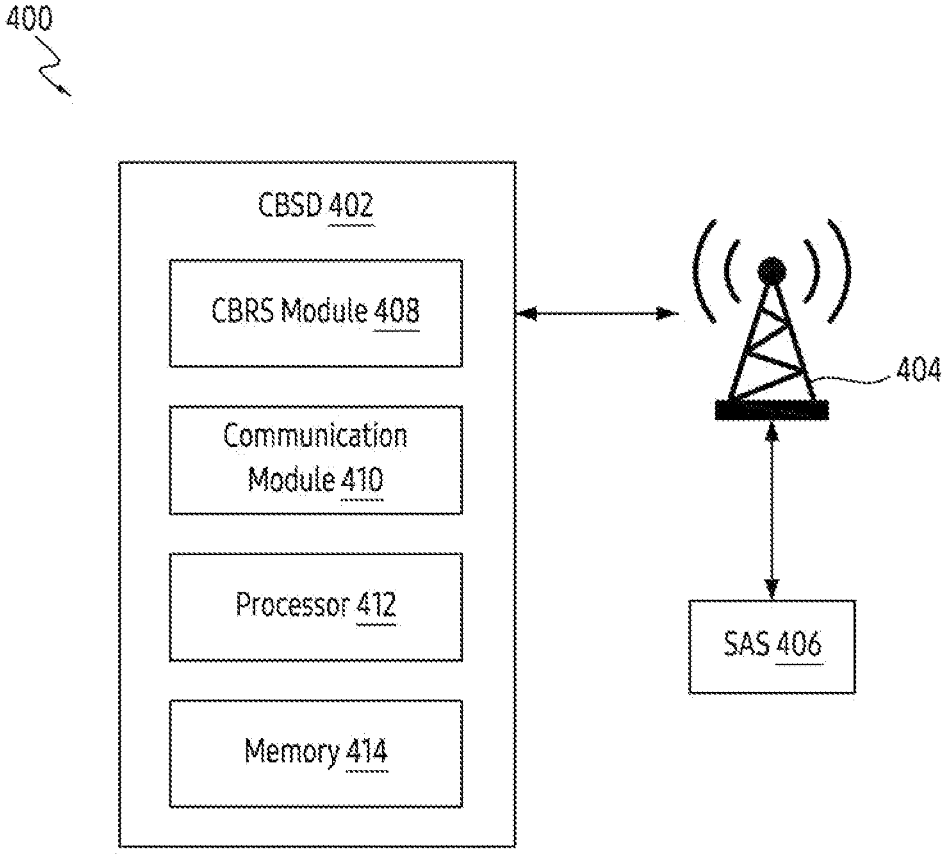
FIG. 4 depicts a system for performing a Citizen Broadband Radio Service (CBRS) operation, according to embodiments as disclosed herein.

FIG. 4 depicts a system 400 for performing CBRS operation. The system 400 includes a CBSD 402, a base station 404, and a SAS 406. In an embodiment herein, the CBSD 402 may be a User Equipment (UE), which is attempting to obtain a CBRS grant. The CBSD 402 includes a CBRS module 408, a communication module 410, a processor 412, and a memory 414.

In an embodiment herein, the CBRS module 408 may be configured to generate at least one channel allocation request. The CBRS module 408 may generate the channel allocation request with a number of a plurality of channel grants required by the CBSD 402 and at least one operation parameter for each desired channel from a list of desired plurality of channels.

In an embodiment herein, the CBRS module 408 may insert the number of plurality of channel grants in the numGrants parameter in the channel allocation request. The CBRS module 408 may further insert the operation parameter for each desired channel in an operationParam array of the channel allocation request. The operation parameter includes a frequency range and a maximum EIRP required by the CBSD 402 for an operation of the CBSD 402.

In an embodiment herein, the CBRS module 408 may be configured for preparing the list of desired plurality of channels in an order of a priority based on required bandwidth and power.

In an embodiment herein, the CBRS module 408 may be further configured to send the channel allocation request to the SAS 406 via a base station 404. The SAS 406 may grant the channel allocation request, which is received from the CBRS module 408, by allocating at least one desired channel to each channel grant based on an availability and an order of a priority of the channels from the list of desired plurality of channels.

In an embodiment herein, the CBRS module 408 may communicate with the base station 404 via the communication module 410. The communication module 410 through which the CBRS module 408 and the base station 404 communicate may be in the form of either a wired network, a wireless network, or a combination thereof. The wired and wireless communication networks may include but not limited to, Global Positioning System (GPS), Global System for Mobile Communications (GSM), Local Area Network (LAN), Wi-Fi compatibility, Bluetooth low energy as well as Near Field Communication (NFC). The wireless communication may further include one or more of Bluetooth, ZigBee, a short-range wireless communication such as Ultra Wide Band (UWB), a medium-range wireless communication such as Wi-Fi or a long-range wireless communication such as 3G/4G or WiMAX, according to the usage environment.

In an embodiment herein, the processor 412 may be configured to process and execute data of plurality of modules of the CBSD 402. The processor 412 may include one or more of microprocessors, circuits, and other hardware configured for processing. The processor 412 may be configured to execute instructions stored in the memory 414. The processor 412 may be at least one of a single processer, a plurality of processors, multiple homogeneous or heterogeneous cores, multiple Central Processing Units (CPUs) of different kinds, microcontrollers, special media, and other accelerators. The processor 412 may be an application processor (AP), a graphics-only processing unit such as a graphics processing unit (GPU), a visual processing unit (VPU), and/or an Artificial Intelligence (AI)-dedicated processor such as a neural processing unit (NPU).

In an embodiment herein, the memory 414 may include one or more volatile and non-volatile memory components which are capable of storing data and instructions of the modules of the CBSD 402 to be executed. Examples of the memory 414 may be, but not limited to, NAND, embedded Multi Media Card (eMMC), Secure Digital (SD) cards, Universal Serial Bus (USB), Serial Advanced Technology Attachment (SATA), solid-state drive (SSD), and so on. The memory 414 may also include one or more computer-readable storage media. Examples of non-volatile storage elements may include magnetic hard discs, optical discs, floppy discs, flash memories, or forms of electrically programmable memories (EPROM) or electrically erasable and programmable (EEPROM) memories. In addition, the memory 414 may, in some examples, be considered a non-transitory storage medium. The term "non-transitory" may indicate that the storage medium is not embodied in a carrier wave or a propagated signal. However, the term "non-transitory" should not be interpreted to mean that the memory 414 is non-movable. In certain examples, a non-transitory storage medium may store data that may, over time, change (e.g., in Random Access Memory (RAM) or cache).

FIG. 4 shows example modules of the CBSD 402, but it is to be understood that other embodiments are not limited thereon. In other embodiments, the CBSD 402 may include less or more number of modules. Further, the labels or names of the modules are used only for illustrative purpose and does not limit the scope of the disclosure. One or more modules may be combined together to perform same or substantially similar function in the CBSD 402.

Figure 5:
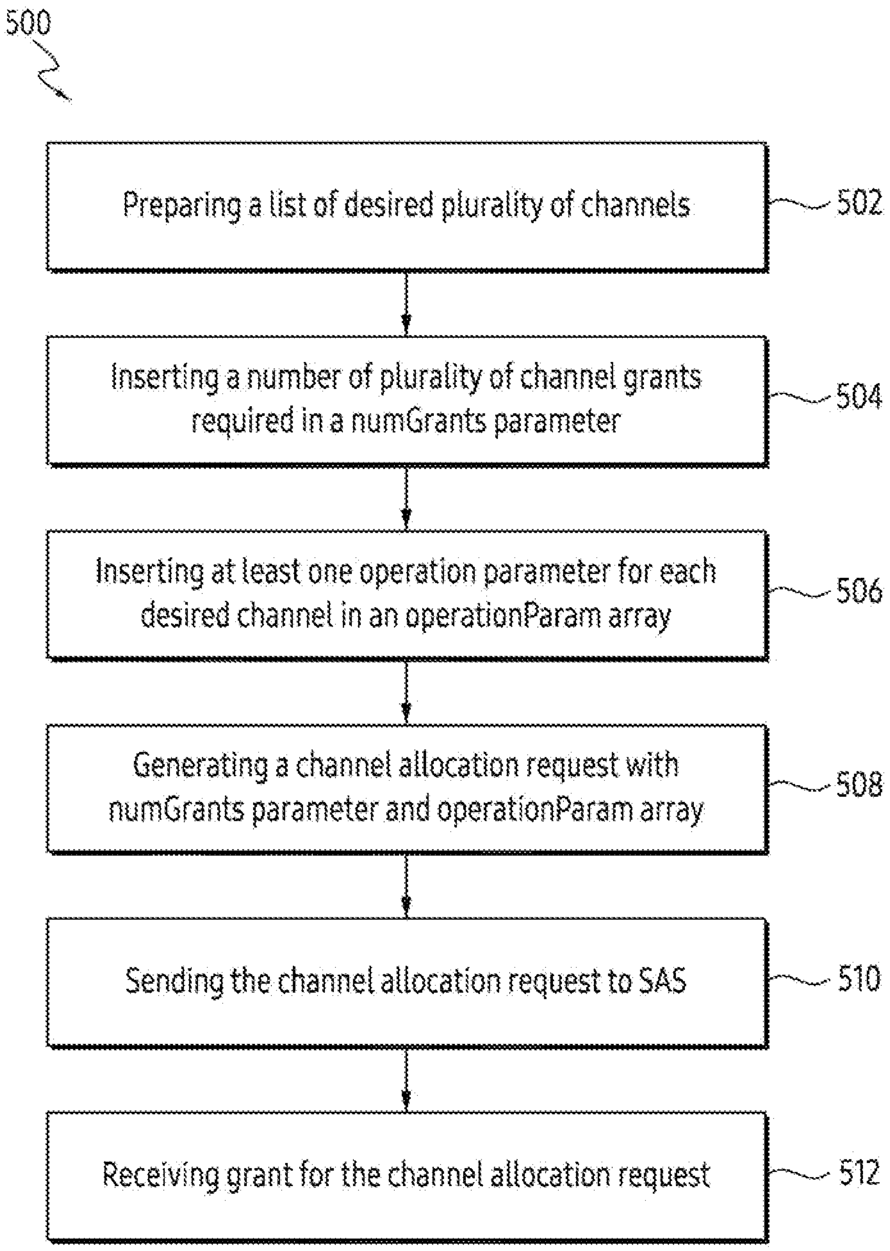
FIG. 5 depicts a method for managing a channel allocation in a CBRS system, according to embodiments as disclosed herein.

FIG. 5 depicts a method 500 for managing a channel allocation in a Citizens Broadband Radio Service (CBRS) system. The method 500 begins with preparing, by the CBRS module 408 of the CBSD 402, a list of desired plurality of channels, as depicted in operation 502, in an order of a priority based on required bandwidth and power. Subsequently, the method 500 discloses inserting, by the CBRS module 408, a number of plurality of channel grants required in a numGrants parameter, as depicted in operation 504. Thereafter, the method 500 discloses inserting, by the CBRS module 408, at least one operation parameter for each desired channel from a list of desired plurality of channels in an operationParam array, as depicted in operation 506.

Later, the method 500 discloses generating, by the CBRS module 408, at least one channel allocation request with the numGrants parameter and the operationParam array, as depicted in operation 508. Thereafter, the method 500 discloses sending, by the CBRS module 408, the channel allocation request to SAS 406, as depicted in operation 510. Later, the method 500 discloses receiving, by the CBRS module 408, a grant for the channel allocation request, as depicted in operation 512, with allocation of at least one desired channel to each channel grant based on an availability and an order of a priority of the channels from the list of desired plurality of channels.

The various operations in method 500 may be performed in the order presented, in a different order or simultaneously. Further, in some embodiments, some actions listed in FIG. 5 may be omitted.

Figure 6:
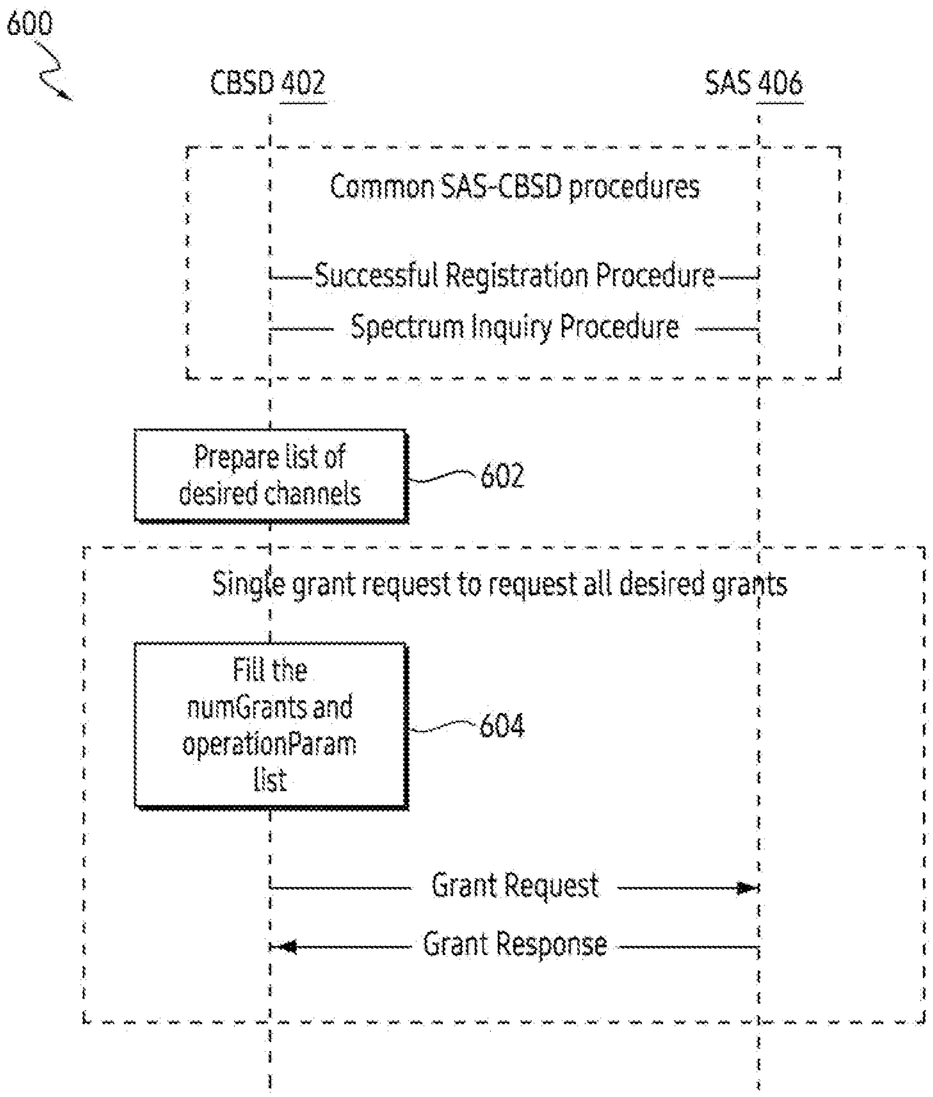
FIG. 6 depicts a protocol flow for a grant procedure to let a registered CBSD request access to spectrum from the Spectrum Access System (SAS), according to embodiments as disclosed herein.

FIG. 6 depicts a protocol flow 600 for a grant procedure to let a registered CBSD 402 request access to spectrum from the SAS 406. The CBSD 402 prepares a desired channel list, as depicted at operation 602, using a spectrum inquiry procedure. As depicted at operation 604, the CBSD 402 fills the numGrants parameter based on the number of channel grants desired, and fills the operationParam array in a grantRequest object using the above channel list. The operationParam array is to be filled in the order of a priority to let the SAS 406 allocate most preferred grant, if available. Thus, a single grant request is sent to the SAS 406 to request a plurality of desired grants. Upon receiving the grant request, the SAS 406 allocates the numGrants grant depending on the availability. Further, the SAS 406 may recommend different channels using the operationParam array.

The SAS 406 has to respond to a successful request or for a disapproved request. If the numGrants parameter is met, the SAS 406 may skip processing other objects shared by the CBSD 402.

Therefore, one CBSD 402 may request multiple operationParam in one grantRequest object and may reduce unnecessary traffic at the SAS 406. The proposed granting procedure may increase the chance of obtaining a preferred grant and enable lower power consumption especially beneficial for industrial Internet of Things (IOT) devices. The proposed procedure enhances the CBRS spectrum allocation process which in turn reduces the requests overhead between the CBSD 402 and the SAS 406. This reduces the load on the SAS 406 and the network, reduces latency and increases the overall throughput to the 4G and 5G system while using the CBRS spectrum.

According to embodiments, a method for managing a channel allocation in a Citizens Broadband Radio Service (CBRS) system, may comprise generating, by a Citizens Broadband Radio Service Device (CBSD), at least one channel allocation request. The at least one channel allocation request comprises a plurality of channel grants required by the CBSD and at least one operation parameter for each desired channel from a list of desired plurality of channels. The method may comprise sending, by the CBSD, the at least one channel allocation request to a Spectrum Access System (SAS).

In an embodiment, the method may comprise preparing, by the CBSD, the list of desired plurality of channels in an order of priority based on required bandwidth and power.

In an embodiment, the method may comprise inserting the plurality of channel grants required in a numGrants parameter in the at least one channel allocation request.

In an embodiment, the at least one operation parameter comprises a frequency range and a maximum equivalent isotropic radiated power (EIRP) required by the CBSD for operation.

In an embodiment, the method may comprise inserting the at least one operation parameter for each desired channel in an operationParam array in the at least one channel allocation request.

In an embodiment, the method may comprise granting, by the SAS, the at least one channel allocation request and allocating at least one desired channel to each channel grant based on availability and order of priority of channels from the list of desired plurality of channels.

According to embodiments, a Citizens Broadband Radio Service Device (CBSD) (402) is configured to generate at least one channel allocation request. The at least one channel allocation request comprises a plurality of channel grants required by the CBSD and at least one operation parameter for each desired channel from a list of desired plurality of channels. The CBSD is configured to send the at least one channel allocation request to a Spectrum Access System (SAS).

In an embodiment, the CBSD is configured to prepare the list of desired plurality of channels in an order of priority based on required bandwidth and power.

In an embodiment, the plurality of channel grants required are inserted in a numGrants parameter in the at least one channel allocation request.

In an embodiment, the at least one operation parameter comprises a frequency range and a maximum equivalent isotropic radiated power (EIRP) required by the CBSD for operation.

In an embodiment, the at least one operation parameter for each desired channel is inserted in an operationParam array in the at least one channel allocation request.

In an embodiment, the SAS is configured to grant the at least one channel allocation request and allocate at least one desired channel to each channel grant based on availability and order of priority of the channels from the list of desired plurality of channels.

According to embodiments, a method performed by a communication system comprising a transmitting device and a receiving device, may comprise generating, by the transmitting device, at least one channel allocation request. The at least one channel allocation request comprises a plurality of channel grants required by the CBSD and at least one operation parameter for each desired channel from a list of desired plurality of channels. The method may comprise sending, by the transmitting device, the at least one channel allocation request to a receiving device. The method may comprise granting, by the receiving device, the at least one channel allocation request and allocating, by the transmitting device, at least one desired channel to each channel grant based on availability and order of priority of the channels from the list of desired plurality of channels.

In an embodiment, the communication system is a Citizens Broadband Radio Service (CBRS) system, the transmitting device is Citizens Broadband Radio Service Device (CBSD), and the receiving device is a Spectrum Access System (SAS).

In an embodiment, the method may comprise preparing, by the transmitting device, the list of desired plurality of channels in an order of priority based on required bandwidth and power.

According to embodiments, a method performed by a Citizens Broadband Radio Service (CBRS) device (CBSD), may comprise, generating a grant request message comprising information on a number of grants and information on operation parameters. Each of the operation parameters is associated with a desired channel identified based on a list of desired channels. The method may comprise sending the grant request message to a Spectrum Access System (SAS).

In an embodiment, the grant request includes information on an identity of the CBSD and information on a measurement report.

In an embodiment, the method may comprise preparing the list of the desired channels in an order of a priority based on required bandwidth and power.

In an embodiment, the method may comprise inserting a plurality of channel grants in the information on the number of grants of the grant request message.

In an embodiment, the information on the number of grants is used to request the grants using one grant request.

In an embodiment, the each of the operation parameters comprises a frequency range and a maximum equivalent isotropic radiated power (EIRP).

In an embodiment, the method may comprise inserting the operation parameters in the information on the operation parameters of the grant request message.

In an embodiment, the method may comprise receiving a grant response message for the grant request message. The grant response message indicates whether a channel grant associated with the grant request message is approved or disapproved.

In an embodiment, the grant response message includes the channel grant is granted the grant request message by allocating at least one desired channel of the desired channels based on an availability and an order of a priority of the desired channels based on the list.

In an embodiment, the CBSD is connected with the SAS via a base station.

According to embodiments, a Citizens Broadband Radio Service Device (CBSD) comprises a transceiver. The CBDS comprises a processor operatively connected with the transceiver. The processor is configured to generate a grant request message comprising information on a number of grants and information on operation parameters, wherein each of the operation parameters is associated with a desired channel identified based on a list of desired channels. The processor is configured to send the grant request message to a Spectrum Access System (SAS).

In an embodiment, the grant request includes information on an identity of the CBSD and information on a measurement report.

In an embodiment, the processor may be configured to prepare the list of the desired channels in an order of a priority based on required bandwidth and power.

In an embodiment, the processor may be configured to insert a plurality of channel grants in the information on the number of grants of the grant request message.

In an embodiment, the information on the number of grants is used to request the grants using one grant request.

In an embodiment, the each of the operation parameters comprises a frequency range and a maximum equivalent isotropic radiated power (EIRP).

In an embodiment, the processor may be configured to insert the operation parameters in the information on the operation parameters of the grant request message.

In an embodiment, the processor may be configured to receive a grant response message for the grant request message. The grant response message indicates whether a channel grant associated with the grant request message is approved or disapproved.

In an embodiment, the grant response message includes the channel grant is granted the grant request message by allocating at least one desired channel of the desired channels based on an availability and an order of a priority of the desired channels based on the list.

In an embodiment, the CBSD is connected with the SAS via a base station.

The embodiments disclosed herein may be implemented through at least one software program running on at least one hardware device and performing network management functions to control the network elements. The network elements may be at least one of a hardware device, or a combination of hardware device and software module.

The foregoing description of the specific embodiments will so fully reveal the general nature of the embodiments herein that others may, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of at least one embodiment, those skilled in the art will recognize that the embodiments herein may be practiced with modification within the spirit and scope of the embodiments as described herein.

What is claimed is:

1. A method performed by a citizens broadband radio service (CBRS) device (CBSD), the method comprising:
determining priorities of a plurality of non-contiguous channels in a CBRS band based on a bandwidth and a power required by the CBSD;
generating a grant request message including information on an identity of the CBSD, information on an array of operation parameter sets corresponding to the plurality of non-contiguous channels, and information on a number of grants requested by the CBSD for the plurality of non-contiguous channels, wherein each of the operation parameter sets in the array includes a frequency range and a maximum equivalent isotropic radiated power (EIRP), and wherein the operation parameter sets are listed in an order of the priorities in the array;
sending the grant request message to a spectrum access system (SAS); and
receiving, from the SAS, a grant response message for indicating channels granted by the SAS from among the plurality of non-contiguous channels, wherein a number of the channels granted by the SAS corresponds to the number of grants requested by the CBSD.

2. The method of claim 1, wherein the grant request message further includes information on a measurement report.

3. The method of claim 1, wherein the information on the number of grants is used to request grants corresponding to the number of grants using a single grant request.

4. The method of claim 1, wherein the grant request message includes an array of grant request objects,
wherein each of the grant request objects in the array represents a request for a grant from the CBSD, and
wherein each of the grant request objects in the array includes the information on the identity of the CBSD, the information on the number of grants, and the information on the array of the operation parameter sets.

5. The method of claim 4, further comprising inserting the information on the array of the operation parameter sets in the grant request message.

6. The method of claim 1, wherein the grant response message indicates whether a grant associated with the grant request message is approved or disapproved based on the information on the number of grants in the grant request message.

7. The method of claim 6, wherein the grant response message includes the grant by allocating at least one channel of the plurality of non-contiguous channels associated with the operation parameter sets in the array based on an availability and the order of the priorities.

8. The method of claim 1, wherein the CBSD is connected with the SAS via a base station.

9. A citizens broadband radio service (CBRS) device (CBSD) comprising:
a transceiver; and
a processor operatively connected with the transceiver, the processor configured to:
determine priorities of a plurality of non-contiguous channels in a CBRS band based on a bandwidth and a power required by the CBSD;
generate a grant request message including information on an identity of the CBSD, information on an array of operation parameter sets corresponding to the plurality of non-contiguous channels, and information on a number of grants requested by the CBSD for the plurality of non-contiguous channels, wherein each of the operation parameter sets in the array includes a frequency range and a maximum equivalent isotropic radiated power (EIRP), and wherein the operation parameter sets are listed in an order of the priorities in the array;

send the grant request message to a spectrum access system (SAS); and receive, from the SAS, a grant response message for indicating channels granted by the SAS from among the plurality of non-contiguous channels, wherein a number of the channels granted by the SAS corresponds to the number of grants requested by the CBSD.

10. The CBSD of claim 9, wherein the grant request message includes information on a measurement report.

11. The CBSD of claim 9, wherein the information on the number of grants is used to request grants corresponding to the number of grants using a single grant request.

12. The CBSD of claim 9, wherein the grant request message includes an array of grant request objects, wherein each of the grant request objects in the array represents a request for a grant from the CBSD, and wherein each of the grant request objects in the array includes the information on the identity of the CBSD, the information on the number of grants, and the information on the array of the operation parameter sets.

13. The CBSD of claim 12, wherein the processor is further configured to insert the information on the array of the operation parameter sets in the grant request message.

14. The CBSD of claim 9, wherein the grant response message indicates whether a grant associated with the grant request message is approved or disapproved based on the information on the number of grants in the grant request message.

15. The CBSD of claim 14, wherein the grant response message includes the grant by allocating at least one channel of the plurality of non-contiguous channels associated with the operation parameter sets in the array based on an availability and the order of the priorities.

16. The CBSD of claim 9, wherein the CBSD is connected with the SAS via a base station.

* * * * *